Nov. 20, 1951        J. P. DRY        2,576,003
EASY LINE BOLT
Filed July 21, 1948
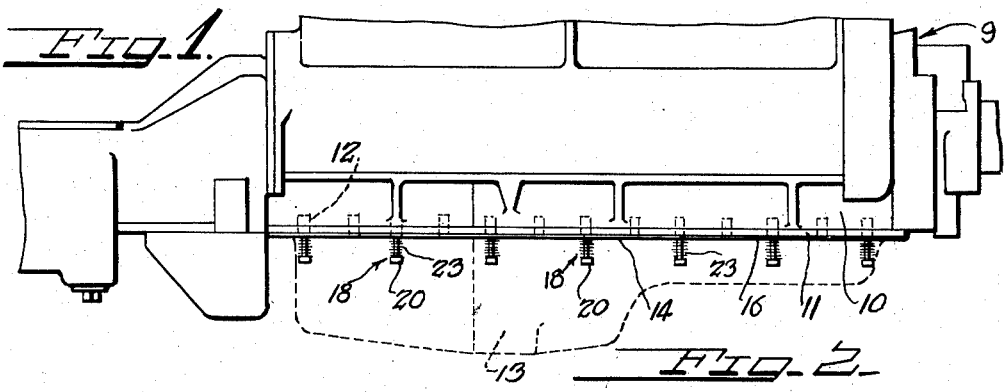
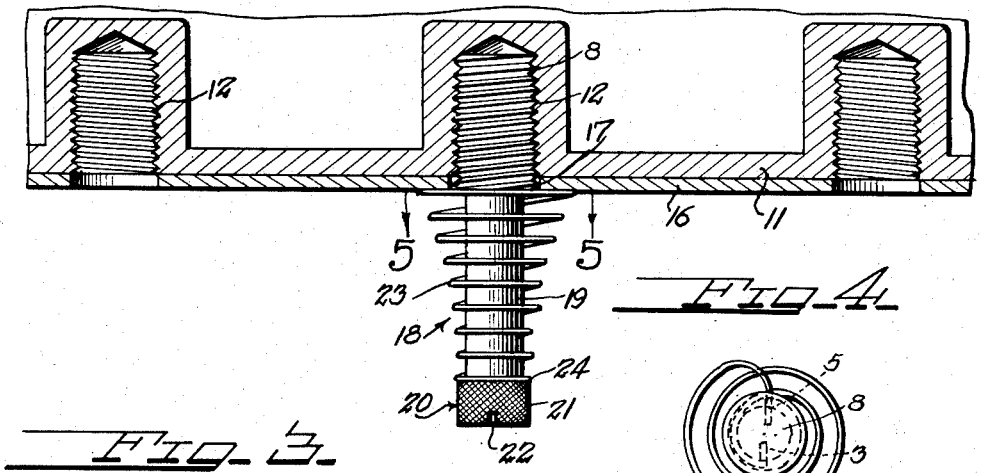
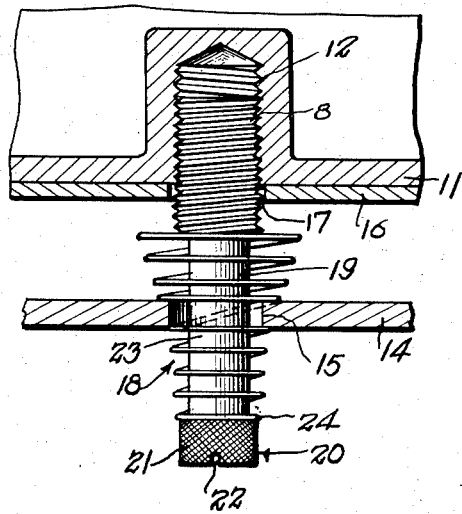
INVENTOR.
J. P. Dry.
BY *Victor J. Evans & Co.*
ATTORNEYS Patented Nov. 20, 1951

2,576,003

UNITED STATES PATENT OFFICE 2,576,003

EASY LINE BOLT

John P. Dry, Winters, Tex.

Application July 21, 1948, Serial No. 39,922

2 Claims. (Cl. 85—1)

This invention relates to a bolt, and more particularly to a bolt for use by an automobile mechanic in replacing an engine gasket.

As heretofore proposed, it has been the practice in replacing certain of the gaskets in an internal combustion engine to cement the gasket to the engine oil pan and then attach the oil pan to the crank case. This is very inconvenient, since it is difficult to keep the gasket aligned with the oil pan and crank case. It has been found that by using the alignment bolts of the present invention, the engine gasket can be replaced without difficulty.

Accordingly, an object of the invention is to provide a bolt for maintaining the gasket in alignment with the engine crank case and oil pan while the mechanic is in the act of positioning the usual bolts employed for securing the oil pan to the crank case.

Another object of the invention is to provide an alignment bolt which may readily and easily be operated by hand to maintain the gasket in position on an engine crank case while the mechanic moves the oil pan into position to be attached to the crank case.

A further object of the invention is to provide an alignment bolt which is extremely simple and inexpensive to manufacture.

Other objects and advantages of the invention will be apparent during the course of the following description.

In the accompanying drawings forming a part of this application, and in which like numerals are employed to designate like parts throughout the same:

Figure 1 is a fragmentary side elevational view illustrating a plurality of alignment bolts positioned to align the gasket with the engine crank case, the position of the oil pan when assembled being shown in dotted lines;

Figure 2 is an enlarged fragmentary side elevational view partly in section, illustrating an alignment bolt maintaining a gasket contiguous to and in alignment with a crank case;

Figure 3 is an enlarged fragmentary side elevational view partly in section illustrating an alignment bolt for use in maintaining a gasket in alignment with the crank case and oil pan;

Figure 4 is a top plan view of the alignment bolt;

Figure 5 is an enlarged sectional view taken on the line 5—5 of Figure 2.

Referring in detail to the drawings, the numeral 10 designates a portion of a crank case of a motor vehicle internal combustion engine 9, which is formed with the usual flange 11 that in turn is provided with a plurality of spaced openings 12 for the reception of the usual securing bolts employed in securing the oil pan 13 to the crank case 10.

The openings 12 are threaded to receive the threads of the usual securing bolts. The oil pan 13 is provided with the conventional flange 14 which has openings 15 that are arranged so that they will align or register with the openings 12 of the crank case.

Normally interposed between the flange 11 of the crank case 10 and the flange 14 of the oil pan 13 is a conventional packing member or gasket 16 which is also provided with openings 17 that align with the openings 12 in the flange 11 and the openings 15 in the flange 14.

In order to maintain the gasket 16 in alignment with the crank case 10 and oil pan 13, a plurality of alignment bolts 18 are provided. Each of the bolts 18 is provided with a threaded end 8 for threaded engagement with the threaded openings 12 of the flange 11. The bolt 18 includes a cylindrical portion 19 adjacent the threaded end 8 thereof, and formed on the other end of the bolt is a cylindrical head 20 of a diameter greater than the cylindrical portion 19. The exterior surface of the head 20 is knurled, as at 21, to facilitate manual turning of the bolt by a mechanic. The head 20 is also provided with a transversely-extending slit or kerf 22 for the reception of an end of a screw driver for tighting the bolt 18. Circumposed on the cylindrical portion 19 of the alignment bolt 18 is a tapered conical helical or coil spring 23 for a purpose to be hereinafter described. The coil spring 23 has a portion 24 arranged in abutting relation to the head 20 and has one end 3 secured, as by welding, in a socket 4 of the bolt 18. The other end 5 of the spring 23 is secured in a socket 6 of the bolt 18. The coil spring 23 is of such a shape that its diameter gradually increases from its end 24 to the other end thereof.

In using the alignment bolt 18, the gasket 16 is cemented and positioned contiguous to the flange 11 of the crank case 10 so that its openings 17 are in alignment with the openings 12 in the flange 11. The end 8 of the alignment bolt is then threaded into the openings 12 of the flange 11 so that the spring 23 will bias or hold the gasket 16 in position. A plurality of bolts 18 are screwed into certain of the openings 12 by either a manually-directed pressure on the knurled head 21, or a screw driver bit can be inserted in the kerf 28 of the bolt 18 to rotate the latter. Next, the oil pan 13 is moved into position below the crank case 10 and gasket 16 so that the heads 20 of the bolts 18 pass through the openings 15 in the flange 14 of the oil pan 13, the diameter of the holes 15 being greater than the diameter of the head 20, as shown in Figure 3. With the oil pan so positioned, the conventional stud bolts are passed through the remaining openings 15 of the flange 14 of the oil pan 13 and threaded into the empty threaded openings 12 of the crank case 10. Then, after several of the usual stud bolts have been inserted, the alignment bolts 18 are removed from threaded engagement with the openings 12 in the crank case and each is replaced by a conventional stud bolt which is threaded into the openings from which the aligned bolts 18 are removed. The diameter of the holes 15 in the flange 14 is large enough to permit passage therethrough of the spring 23 of the bolt 18 as the alignment bolts 18 are unscrewed from the openings 12 in the flange 11.

From the foregoing description and a study of the drawings, it will be apparent that I have provided a new construction. It is, of course, to be understood that I reserve the right to make such changes in the form, construction, and arrangement of parts as will not depart from the spirit of the invention or the scope of the appended claims.

I claim:

1. In a bolt provided with an exteriorly-threaded end, a cylindrical portion extending from said threaded end and having a smaller diameter than the threaded end, a knurled head on the other end of said bolt for rotating the latter, said cylindrical portion having an inwardly extending socket adjacent said head and said threaded end and said sockets extending inwardly of said portion from opposite sides thereof and resilient means embodying a conical helical spring circumposed on said cylindrical portion for biasing a sealing member away from said head and the ends of said springs being fixed in the sockets in said portion with the base of the conical spring adjacent said threaded end.

2. In a bolt provided with an exteriorly-threaded end, a cylindrical portion extending from said threaded end and having a smaller diameter than the threaded end, a knurled head on the other end of said bolt for rotating the latter, said cylindrical portion having an inwardly extending socket adjacent said head and said threaded end and said sockets extending inwardly of said portion from opposite sides thereof and resilient means embodying a conical helical spring circumposed on said cylindrical portion for biasing a sealing member away from said head and the ends of said springs being fixed in the sockets in said portion with the base of the conical spring adjacent said threaded end, there being a transversely-extending slit in said head for the reception of an end of a tool.

JOHN P. DRY.

REFERENCES CITED

The following references are of record in the file of this patent:

UNITED STATES PATENTS

| Number | Name | Date |
|---|---|---|
| 867,299 | Pfluger | Oct. 1, 1907 |
| 1,077,410 | Kling | Nov. 4, 1913 |
| 1,281,548 | Frederick | Oct. 15, 1918 |
| 1,737,466 | Lynd | Nov. 26, 1929 |
| 1,753,773 | Champion | Apr. 8, 1930 |
| 1,921,379 | Bailey | Aug. 8, 1933 |
| 2,028,022 | Sieminski | Jan. 14, 1936 |
| 2,123,527 | Golden | July 12, 1938 |
| 2,133,465 | Purtell | Oct. 18, 1938 |
| 2,201,930 | Stark | May 21, 1940 |
| 2,491,085 | Burrows | Dec. 13, 1949 |